United States Patent
Williams et al.

(10) Patent No.: US 10,171,512 B2
(45) Date of Patent: Jan. 1, 2019

(54) NETWORK NODE

(71) Applicant: METASWITCH NETWORKS LTD, Enfield (GB)

(72) Inventors: Matthew Williams, Enfield (GB); Alex Hockey, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 245 days.

(21) Appl. No.: 15/054,619

(22) Filed: Feb. 26, 2016

(65) Prior Publication Data

US 2016/0255120 A1   Sep. 1, 2016

(30) Foreign Application Priority Data

Feb. 27, 2015  (GB) .................................. 1503407.7

(51) Int. Cl.
*G06F 15/16* (2006.01)
*H04L 29/06* (2006.01)
*H04L 29/08* (2006.01)

(52) U.S. Cl.
CPC ........ *H04L 65/1006* (2013.01); *H04L 67/142* (2013.01); *H04L 67/28* (2013.01); *H04L 67/2842* (2013.01); *H04L 67/2861* (2013.01)

(58) Field of Classification Search
CPC .... H04L 65/1006; H04L 65/105; H04L 67/14
USPC ........................................................ 709/227
See application file for complete search history.

(56) References Cited

U.S. PATENT DOCUMENTS

| | | | |
|---|---|---|---|
| 2005/0083912 A1 | 4/2005 | Afshar et al. | |
| 2008/0256256 A1* | 10/2008 | Acharya | H04L 65/105 709/238 |
| 2009/0248800 A1 | 10/2009 | Chu et al. | |
| 2013/0212298 A1* | 8/2013 | Bunch | H04L 45/42 709/244 |

FOREIGN PATENT DOCUMENTS

| | | |
|---|---|---|
| EP | 1986388 A1 | 10/2008 |
| EP | 2059001 A1 | 5/2009 |

OTHER PUBLICATIONS

UKIPO Search Report dated Aug. 28, 2015 for GB Application No. GB1503407.7.

* cited by examiner

*Primary Examiner* — Wing F Chan
*Assistant Examiner* — Andrew Woo
(74) *Attorney, Agent, or Firm* — EIP US LLP

(57) ABSTRACT

Measures, including methods, systems and computer-readable storage mediums, for use in operating a network node in a network. Signalling information for an in-progress communication session dialog is processed according to a stateless operating mode. The processing according to the stateless operating mode includes storing communication session dialog state data associated with the communication session dialog. An operating mode change trigger is detected. In response to the detection, the stored communication session dialog state data associated with the communication session dialog is retrieved. Signalling information for the in-progress communication session dialog is processed according to a state-full operating mode. The processing according to the state-full operating mode is carried out at least in part on the basis of the retrieved communication session dialog state data associated with the communication session dialog.

32 Claims, 6 Drawing Sheets

NETWORK NODE

CROSS-REFERENCE TO RELATED APPLICATIONS

This application claims priority under 35 U.S.C. § 119(a) to UK patent application no. GB 1503407.7, filed on Feb. 27, 2015, the entire content of which is hereby incorporated by reference.

BACKGROUND OF THE INVENTION

Field of the Invention

The present disclosure relates to a network node. In particular, but not exclusively, the present disclosure relates to measures for use in operating a network node in a network.

Description of the Related Technology

Session Initiation Protocol (SIP) devices generally fall into one of three categories as follows:

User agents (UAs) are terminal (or 'endpoint' or 'user') devices such as mobile (or 'cellular') telephones, tablets, laptops, desktop personal computer (PC), etc;

Proxies are network nodes which are typically relatively 'basic' (in terms of supported functionality) but high-performance servers; and Back-to-back User Agents (B2BUAs) are network nodes which are typically relatively 'advanced' (in terms of supported functionality) but lower-performance servers.

The difference between a proxy and a B2BUA is that SIP dialogs (communication sessions such as telephone calls) pass through proxies untouched while a B2BUA establishes two (or more) SIP dialogs and bridges between them. Note that SIP is a signaling protocol and reference here is to signaling flows (c.f. the media data for communication sessions might still flow end-to-end even with a B2BUA).

Due to the fact that B2BUAs bridge between two (or more) separate dialogs, they have much more control. In particular, they can initiate new SIP requests. Proxies cannot initiate new SIP requests.

Since a B2BUA has two (or more) separate dialogs, it maintains state for both these dialogs and map between them. A proxy only has a single dialog and so need not maintain state for the single dialog.

Call jump (or 'call transfer' or 'access transfer') services enables users to 'jump' their calls from one device associated with the user to another device associated with the user. For example, the user may receive a call on their desktop PC and then jump it to their mobile telephone because they are about to leave the office. As another example, a user may might start a call over Voice over Long-Term Evolution (VoLTE) (4G) and then access transfer it to 2G/3G upon loss of the 4G signal.

Some SIP flows used in relation to call jump work peer-to-peer between the UAs themselves. Whilst these flows are in general compliant with the Internet Protocol Multimedia Core Network Subsystem (IMS) standards and end-user devices tend to support them, some Interconnection Border Control Function (IBCF) and Media Gateway Control Function (MGCF) network nodes (or 'network entities') do not. In the case of 'access transfer', the VoLTE specifications mandate that this is implemented in the core of the network.

It would therefore be desirable to provide improved measures for use in operating network nodes, including for example in relation to call jump services.

SUMMARY

According to embodiments, there is a method of operating a network node in a network, the method comprising, at the network node: processing signaling information for an in-progress communication session dialog according to a stateless operating mode, wherein the processing according to the stateless operating mode comprises storing communication session dialog state data associated with the communication session dialog; detecting an operating mode change trigger; in response to the detection, retrieving the stored communication session dialog state data associated with the communication session dialog; and processing signaling information for the in-progress communication session dialog according to a state-full operating mode, wherein the processing according to the state-full operating mode is carried out at least in part on the basis of the retrieved communication session dialog state data associated with the communication session dialog.

According to embodiments, there is a system for use in operating a network node in a network, the system comprising at least one memory including computer program code; and at least one processor in data communication with the at least one memory, wherein the at least one processor is configured to, at the network node: process signaling information for an in-progress communication session dialog according to a stateless operating mode, wherein the processing according to the stateless operating mode comprises storing communication session dialog state data associated with the communication session dialog; detect an operating mode change trigger; in response to the detection, retrieve the stored communication session dialog state data associated with the communication session dialog; and process signaling information for the in-progress communication session dialog according to a state-full operating mode, wherein the processing according to the state-full operating mode is carried out at least in part on the basis of the retrieved communication session dialog state data associated with the communication session dialog.

According to embodiments, there is a non-transitory computer-readable storage medium comprising computer-executable instructions which, when executed by a processor, cause a computing device to perform a method of operating a network node in a network, the method comprising, at the network node: processing signaling information for an in-progress communication session dialog according to a stateless operating mode, wherein the processing according to the stateless operating mode comprises storing communication session dialog state data associated with the communication session dialog; detecting an operating mode change trigger; in response to the detection, retrieving the stored communication session dialog state data associated with the communication session dialog; and processing signaling information for the in-progress communication session dialog according to a state-full operating mode, wherein the processing according to the state-full operating mode is carried out at least in part on the basis of the retrieved communication session dialog state data associated with the communication session dialog.

According to embodiments, there is a method of operating a network node in a network, the method comprising, at the network node: processing signaling information for an in-progress communication session dialog according to a stateless operating mode;

storing communication session dialog state data associated with the communication session dialog; detecting an operating mode change trigger; in response to the detection, retrieving the stored communication session dialog state data associated with the communication session dialog; and entering a state-full operating mode in relation to the in-progress communication session dialog, wherein the entering is carried out at least in part on the basis of the retrieved communication session dialog state data associated with the communication session dialog and the entering comprises transmitting at least one communication session dialog update request comprising contact data for the network node.

According to embodiments, there is a system for use in operating a network node in a network, the system comprising at least one memory including computer program code; and at least one processor in data communication with the at least one memory, wherein the at least one processor is configured to, at the network node: process signaling information for an in-progress communication session dialog according to a stateless operating mode; store communication session dialog state data associated with the communication session dialog; detect an operating mode change trigger; in response to the detection, retrieve the stored communication session dialog state data associated with the communication session dialog; and enter a state-full operating mode in relation to the in-progress communication session dialog, wherein the entering is carried out at least in part on the basis of the retrieved communication session dialog state data associated with the communication session dialog and the entering comprises transmitting at least one communication session dialog update request comprising contact data for the network node.

Embodiments comprises a non-transitory computer-readable storage medium comprising computer-executable instructions which, when executed by a processor, cause a computing device to perform methods according to the above described method embodiments.

Further features of embodiments will become apparent from the following description, given by way of example only, which is made with reference to the accompanying drawings.

DETAILED DESCRIPTION OF CERTAIN INVENTIVE EMBODIMENTS

Figure 1:
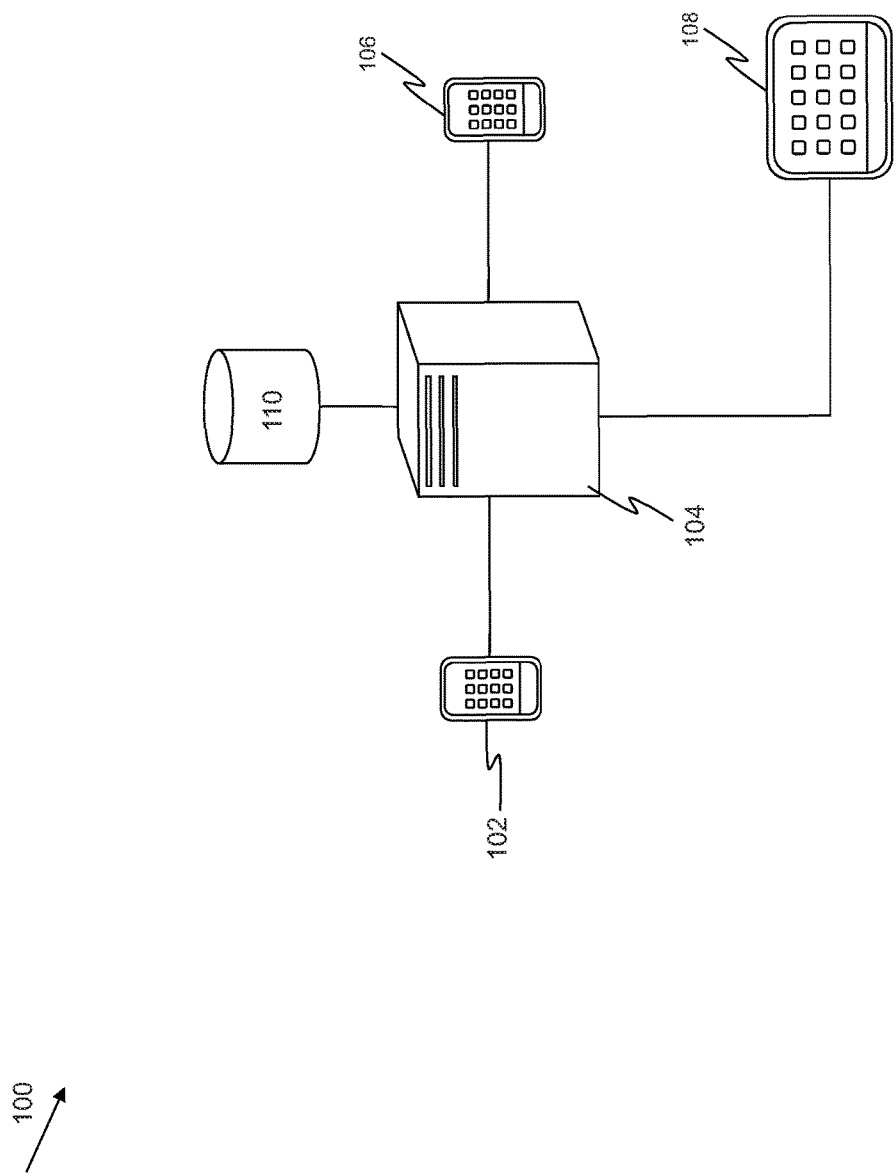
FIG. 1 shows a system diagram of a network according to embodiments.

Embodiments comprise a network node which is capable of operating in a stateless mode (for example a proxy mode) and a state-full mode (for example a B2BUA mode) for flows between one or more other devices. According to embodiments, the network node is capable of handling flows in the mainline in a stateless mode (for example operating as a proxy) for performance reasons and also capable of handling flows in a state-full mode (for example operating as a B2BUA) where required (for example if call jump services are required).

SIP proxies are generally more efficient than SIP B2BUAs. However, proxies cannot initiate SIP requests themselves, which means they have limited function. Embodiments therefore provide measures which allow a network node (for example a SIP compliant network node) to initially act as a proxy for a communication session (such as a SIP call) and then 'uplift' its operation such that it acts as a B2BUA when required for the communication session. Communication sessions that have undergone call jump will typically be handled by a B2BUA, but since relatively few communication sessions are jumped, embodiments allow performance to be boosted by handling communication sessions as a proxy where appropriate.

Embodiments comprise measures, including methods, apparatus and computer program products, for use in operating a network node (such as network node 104 of FIG. 1 described below) in a network (such as network 100 of FIG. 1 described below). The network node processes signaling information for an in-progress communication session dialog according to a stateless operating mode. The processing according to the stateless operating mode comprises storing communication session dialog state data associated with the communication session dialog. The network node detects an operating mode change trigger, and in response to the detection, retrieves the stored communication session dialog state data associated with the communication session dialog. The network node then processes signaling information for the in-progress communication session dialog according to a state-full operating mode. The processing according to the state-full operating mode is carried out at least in part on the basis of the retrieved communication session dialog state data associated with the communication session dialog. The switch to processing according to the state-full operating mode can be referred to as uplifting from the stateless operating mode to the state-full operating mode.

Embodiments comprise measures, including methods, apparatus and computer program products for use in operating a network node in a network. The network node processes signaling information for an in-progress communication session dialog according to a stateless operating mode. The network node stores communication session dialog state data associated with the communication session dialog. The network node detects an operating mode change trigger, and in response to the detection, retrieves the stored communication session dialog state data associated with the communication session dialog. The network node then enters a state-full operating mode in relation to the in-progress communication session dialog; in such embodiments, the entering is carried out at least in part on the basis of the retrieved communication session dialog state data associated with the communication session dialog and the entering comprises transmitting at least one communication session dialog update request comprising contact data for the network node. The entering of the state-full operating mode can be referred to as uplifting from the stateless operating mode to the state-full operating mode.

In embodiments, the processing according to the stateless operating mode does not comprise retrieving the stored communication session dialog state data associated with the communication session dialog.

In embodiments, the network node stores communication session dialog state when processing signaling information for the dialog in the stateless operating mode, but does not need to refer to the stored state in order to operate in the stateless operating mode for the communication session dialog In embodiments, the detecting comprises inferring the operating mode change trigger from the signaling information for the in-progress communication session dialog processed according to the stateless operating mode. In alternative embodiments, an operating mode change trigger can be inferred from an out-of-band request (over a different communication mechanism) or from a third-party request.

Embodiments comprise, prior to the detecting, the network node receiving a message from a device; in such embodiments, the detecting comprises inferring the operating mode change trigger from the received message. In embodiments, the received message does not comprise communication session dialog state data. In embodiments, the received message does not comprise an explicit request to change operating mode. The received message may for example comprise a request message or a response message.

The embodiments of FIGS. 2 to 6 are exemplarily described below in terms of SIP protocol messages. A SIP INVITE message is an example of a SIP message which comprises a request.

In embodiments, the stateless operating mode comprises a proxy signaling mode and the state-full operating mode comprises a back-to-back user agent signaling mode.

FIG. 1 shows a system diagram of a network 100 according to embodiments. Network 100 comprises a network node 104, a data store 110 and user devices 102, 106, 108. The user devices could also be referred to as endpoint devices, terminal devices, or user agents. In practice, network 100 could have a different number of user devices.

Network node 104 may for example comprise a server, softswitch, gateway, application server or other such network entity which is capable of processing signaling information for communication session dialogs in network 100. Network node 104 is capable of communicating with data store 110, for example to store data therein or retrieve data stored therein. Data store may be located locally to network node 104.

Network node 104 is also capable of communicating with user devices 102, 106, 108, for example via one or more wireless or wired communication links and/or one or more other networks or network parts such as an IMS core (not shown).

Figure 2:
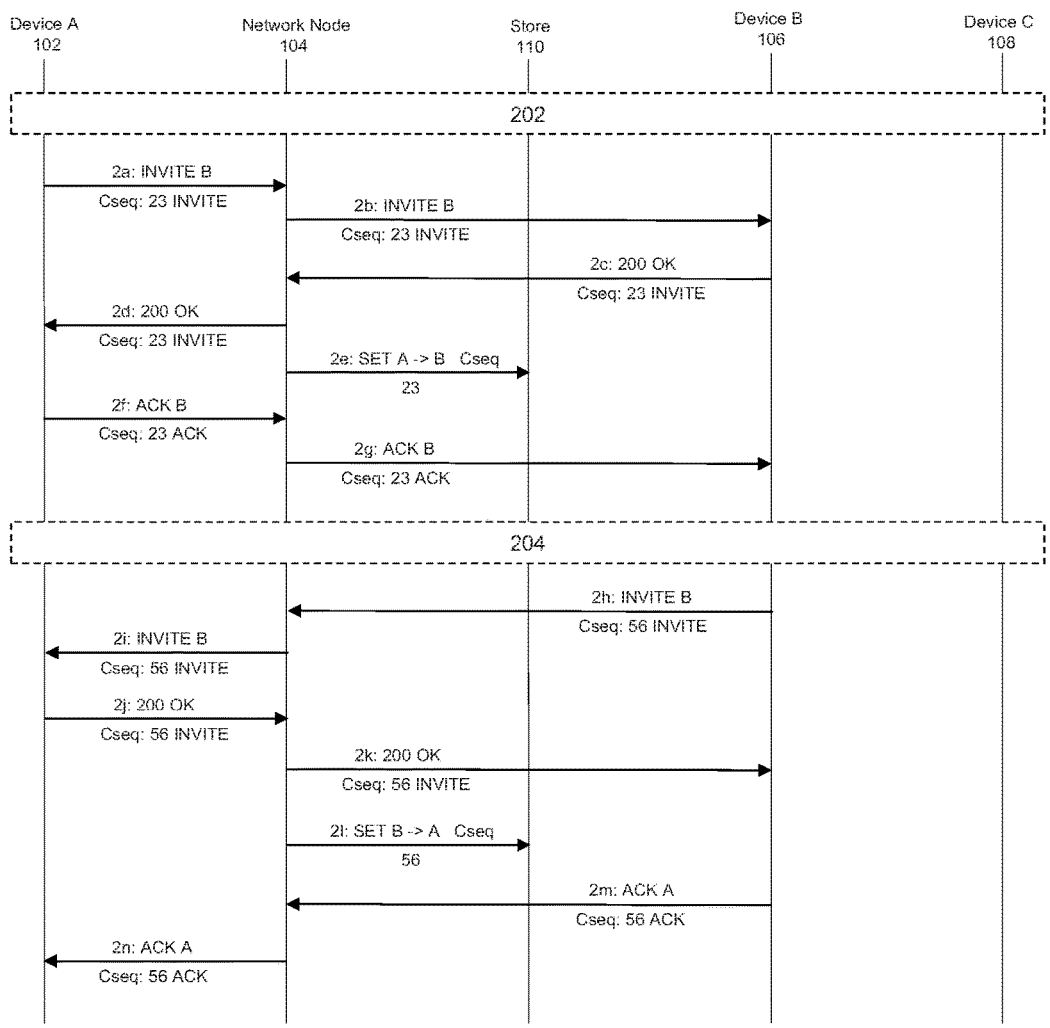
FIG. 2 shows a message flow diagram according to embodiments.

FIG. 2 shows a message flow diagram according to embodiments. FIG. 2 shows a message flow between a device A (for example user device 102 of FIG. 1), data store 110 and a device B (for example user device 106 of FIG. 1).

In the embodiments of FIG. 2, network node 104 operates as a proxy initially, storing (but not reading back) communication session dialog state, in particular the command sequence numbers (CSeqs) in both directions. In some embodiments, the stored communication dialog state comprises one or more Contact headers, a route-set, to/from tags and a Call-Id.

According to embodiments, item 202 indicates broadly the actions carried out in steps 2a to 2g, namely that device A sends a SIP INVITE message to device B with an example CSeq of 23, which network node 104 writes to data store 110 and forwards to device B.

In more detail according to embodiments, in step 2a, device A sends a SIP INVITE message to device B with a CSeq number of 23. The SIP INVITE message of step 2a is received at network node 104 and forwarded on to device B in step 2b with a CSeq number of 23. In step 2c, device B transmits a SIP 200 OK message back to network node 104 with a CSeq number of 23. The 200 OK message of step 2c is received at network node 104 and forwarded on to device A in step 2d with a CSeq number of 23.

In step 2e, network node 104 writes state data for the communication session dialog from device A to device B in data store 110, in this case comprising a CSeq number of 23.

In step 2f, device A sends a SIP ACK message to device B with a CSeq number of 23. The SIP ACK message of step 2f is received at network node 104 and forwarded on to device B in step 2g with a CSeq number of 23.

According to embodiments, item 204 indicates broadly the actions carried out in steps 2h to 2n, namely that device B sends a SIP INVITE to device A with a CSeq of 56, which network node 104 writes to data store 110 and forwards to device A.

In more detail according to embodiments, in step 2h, device B sends a SIP INVITE message to device A with a CSeq number of 56. The SIP INVITE message of step 2h is received at network node 104 and forwarded on to device A in step 2i with a CSeq number of 56. In step 2j, device A transmits a SIP 200 OK message back to network node 104 with a CSeq number of 56. The 200 OK message of step 2j is received at network node 104 and forwarded on to device B in step 2k with a CSeq number of 56.

In step 2l, network node 104 writes state data for the communication session dialog from device B to device A in data store 110, in this case comprising a CSeq number of 56.

In step 2m, device B sends a SIP ACK message to device A with a CSeq number of 56. The SIP ACK message of step 2m is received at network node 104 and forwarded on to device A in step 2n with a CSeq number of 56.

In embodiments, the processing according to the state-full operating mode comprises transmitting at least one communication session dialog update request comprising contact data for the network node. In such embodiments, the switch to processing according to the state-full operating mode (or 'entering the state-full operating mode') can be referred to as uplifting from the stateless operating mode to the state-full operating mode.

In embodiments, the in-progress communication session dialog comprises a communication session dialog between a first device and at least a second device, and the processing according to the state-full operating mode comprises transmitting a first communication session dialog update request to the first device comprising contact data for the network node and transmitting a second communication session dialog update request to the at least second device comprising the contact data for the network node.

In embodiments, the contact data indicates a destination address of the network node as a destination to where subsequent requests should be transmitted.

In embodiments, the contact data is inserted in a Contact header field of the respective communication session dialog update request.

In embodiments, in response to the transmittal of the first communication session dialog update request a first communication session dialog between the network node and the first device is established, and in response to the transmittal of the at least second communication session dialog update request a second communication session dialog between the network node and at least the second device is established.

Embodiments comprise the network node storing communication session dialog state data associated with the first and at least second established communication session dialogs.

Figure 3:
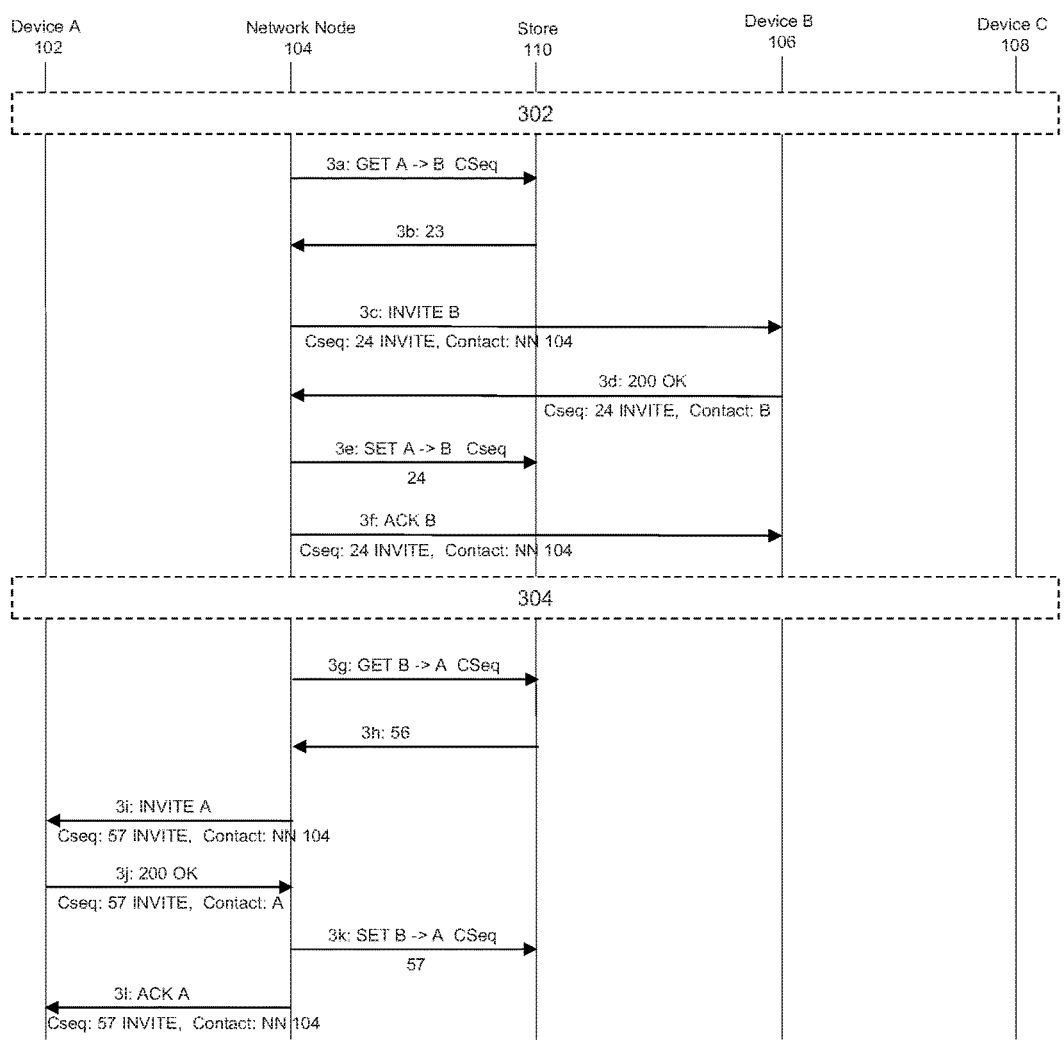
FIG. 3 shows a message flow diagram according to embodiments.

FIG. 3 shows a message flow diagram according to embodiments. The embodiments of FIG. 3 show a message flow between device A and device B, for example subsequent to the message flow of the embodiments of FIG. 2.

In the embodiments of FIG. 3, network node 104 uplifts the communication session from proxy mode to B2BUA mode. Upon uplift, network node 104 looks up the dialog state from store 110 and re-INVITEs each half (i.e. either 'side' of network node 104) of the dialog, specifying network node 104 in the Contact header, thus creating two separate dialogs.

According to embodiments, item 302 indicates broadly the actions carried out in steps 3a to 3f. Network node 104 retrieves the CSeq for the communication session dialog in the device A to device B direction and fakes a SIP INVITE to device B with Contact address set to that of network node 104.

In more detail according to embodiments, in step 3a, network node 104 retrieves state data for the communication session dialog in the device A to device B direction. The retrieve action of step 3a results in a CSeq of 23 being received by network node 104 in step 3b.

In step 3c, network node 104 sends a SIP INVITE message to device B with a CSeq number of 24 and Contact address set to that of network node 104. The Contact address indicates a destination address for where subsequent requests (such as SIP INVITE messages) should be transmitted.

In step 3d, device B transmits a SIP 200 OK message back to network node 104 with a CSeq number of 24 and Contact address set to that of device B.

In step 3e, network node 104 writes state data for the communication session dialog from network node 104 to device B in data store 110, in this case comprising a CSeq number of 24 with a label indicating that the data relates to a communication session dialog from device A to device B.

In step 3f, network node 104 sends a SIP ACK message to device B with a CSeq number of 24 and Contact address set to that of network node 104.

According to embodiments, item 304 indicates broadly the actions carried out in steps 3g to 3l. Network node 104 retrieves the CSeq for the communication session dialog in the device B to device A direction and fakes a SIP INVITE to device A with Contact address set to that of network node 104.

In more detail according to embodiments, in step 3g, network node 104 retrieves state data for communication session dialog in the device B to device A direction. The retrieve action of step 3g results in a CSeq of 56 being received by network node 104 in step 3h.

In step 3i, network node 104 sends a SIP INVITE message to device A with a CSeq number of 57 and Contact address set to that of network node 104. In step 3j, device A transmits a SIP 200 OK message back to network node 104 with a CSeq number of 57 and Contact address set to that of device A.

In step 3k, network node 104 writes state data for the communication session dialog from network node 104 to device A in data store 110, in this case comprising a CSeq number of 57 with a label indicating that the data relates to a communication session dialog from device B to device A.

In step 3l, network node 104 sends a SIP ACK message to device A with a CSeq number of 57 and Contact address set to that of network node 104.

In embodiments, the request received by the network node comprises a communication session dialog transfer request.

In some embodiments, the device from which the request is received is involved in the communication session dialog, the device from which the request is received is associated with a given user, and the communication session dialog transfer request comprises a request to transfer the communication session dialog from the device associated with the given user which is involved in the communication session dialog to another device associated with the given user which is not involved in the communication session dialog. Such embodiments relate to a call jump operation where the call jump comprises a call push.

In other embodiments, the device from which the request is received is not involved in the communication session dialog, the device from which the request is received is associated with a given user, and the communication session dialog transfer request comprises a request to transfer the communication session dialog from a dialog to the device associated with the given user which is not involved in the communication session dialog. Such embodiments relate to an access transfer or call jump operation where the operation comprises a call pull.

In some embodiments, the received request comprises a Session Initiation Protocol SIP INVITE message, a SIP REFER message, or a SIP INVITE (Replaces) message.

Figure 4:
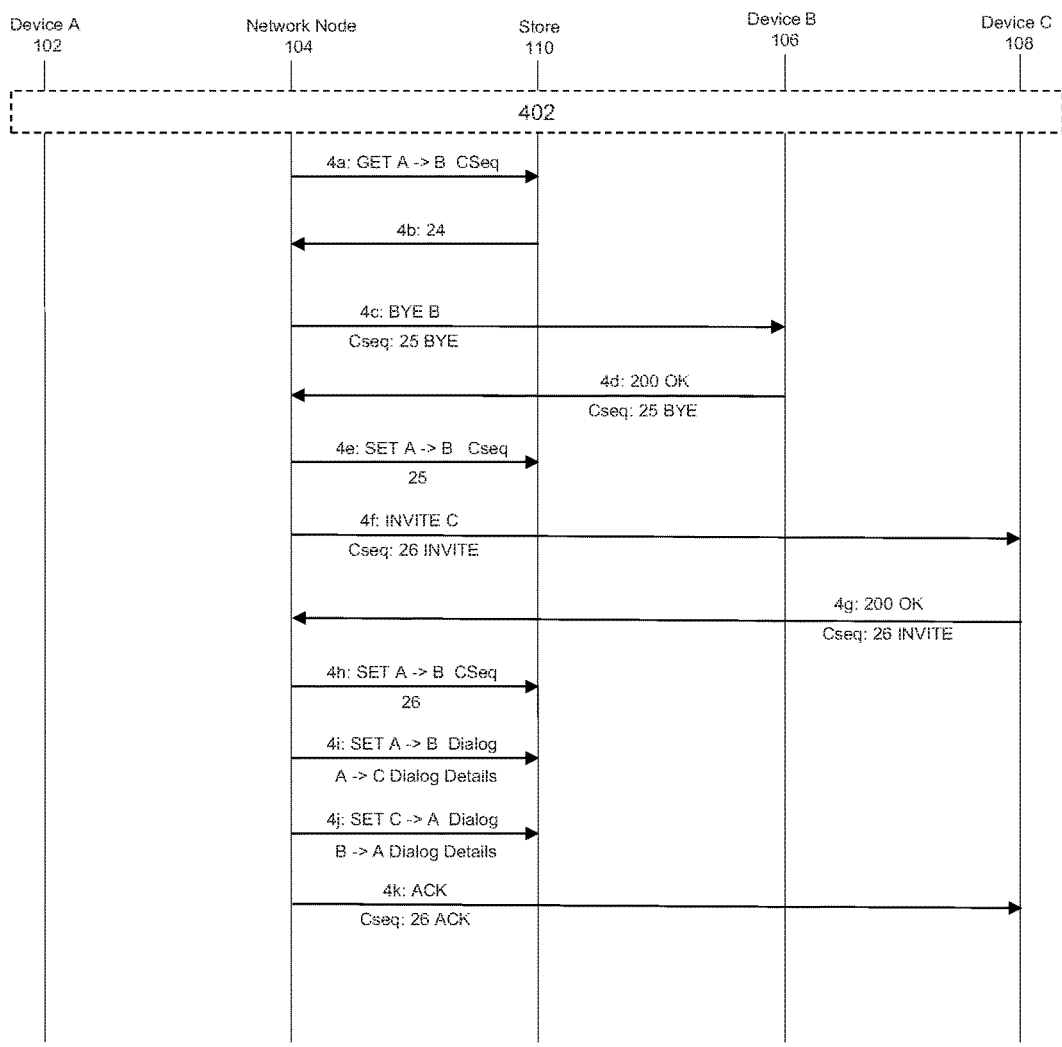
FIG. 4 shows a message flow diagram according to embodiments.

FIG. 4 shows a message flow diagram according to embodiments. FIG. 4 shows a message flow between device B and a device C (for example user device 108 of FIG. 1), for example subsequent to the message flow of the embodiments of FIG. 3.

In the embodiments of FIG. 4, network node 104 performs B2BUA mode operations on the separate dialogs, in this case cancelling an existing dialog and setting up a new dialog to a new destination. In this example, the dialog between network node 104 and device B is cancelled and a new dialog between network node 104 and device C is set up.

According to embodiments, item 402 indicates broadly the actions carried out in steps 4a to 4k where network node 104 is able to manipulate the dialog between network node 104 and device A independently of the dialog between network node 104 and device B, in this case replacing the latter dialog with a dialog between network node 104 and device C.

In step 4a, network node 104 retrieves the CSeq for the communication session dialog in the device A to device B direction. The retrieve action of step 4a results in a CSeq of 24 being received by network node 104 in step 4b.

In step 4c, network node 104 sends a SIP BYE message to device B with a CSeq of 25. In step 4d, device B transmits a SIP 200 OK message back to network node 104 with a CSeq number of 25.

In step 4e, network node 104 writes state data for the communication session dialog from network node 104 to device B in data store 110, in this case comprising a CSeq number of 25 with a label indicating that the data relates to a communication session dialog from device A to device B.

In step 4f, network node 104 sends a SIP INVITE message to device C with a CSeq number of 26. In step 4g, device C transmits a SIP 200 OK message back to network node 104 with a CSeq number of 26.

In step 4h, network node 104 writes state data for the communication session dialog from network node 104 to device C in data store 110, in this case comprising a CSeq number of 26 with a label indicating that the data relates to a communication session dialog from device A to device B.

In step 4i, network node 104 writes state data for the communication session dialog from device A to device C in data store 110 with a label indicating that the data relates to a communication session dialog from device A to device B.

In step 4*j*, network node 104 writes state data for the communication session dialog from device B to device A in data store 110 with a label indicating that the data relates to a communication session dialog from device C to device A.

Steps 4*i* and 4*j* allow device A to be kept under the impression that it is still in communication with device B, when in reality it is now in communication with device C.

When network node 104 receives a subsequent request from device C for sending to device A, the network node 104 retrieves stored data associated with the dialog between device B and device A (which is labelled in the store as state data associated with a communication session dialog between device C and device A).

When network node 104 receives a subsequent request from device A for sending to device B, network node 104 retrieves stored data associated with the dialog between device A and device C (which is labelled in the store as state data associated with a communication session dialog between device A and device B).

In step 4*k*, network node 104 sends a SIP ACK message to device C with a CSeq number of 26.

Embodiments comprise the network node receiving a further request, identifying that the further received request comprises the contact data for the network node, and in response to the identification, processing the further received request according to the state-full operating mode.

In embodiments, processing the further received request according to the state-full operating mode comprises retrieving stored communication session dialog state data for one or more communication session dialogs associated with the further received request.

In embodiments, the retrieved stored communication session dialog state data for the one or more communication session dialogs comprises data identifying a different device than a device from which the further received request was received, and processing the further received request according to the state-full operating mode comprises forwarding the further received request to the identified different device.

In embodiments, the contact data for the network node is comprised in a uniform resource identifier (URI) field of the further received request.

Embodiments comprise the network node, in response to the identification, ignoring the contents of one or more Route header fields of the further received request. In some such embodiments, the ignoring comprises not forwarding the further received request to a destination identified in the one or more Route header fields of the further received request.

Figure 5:
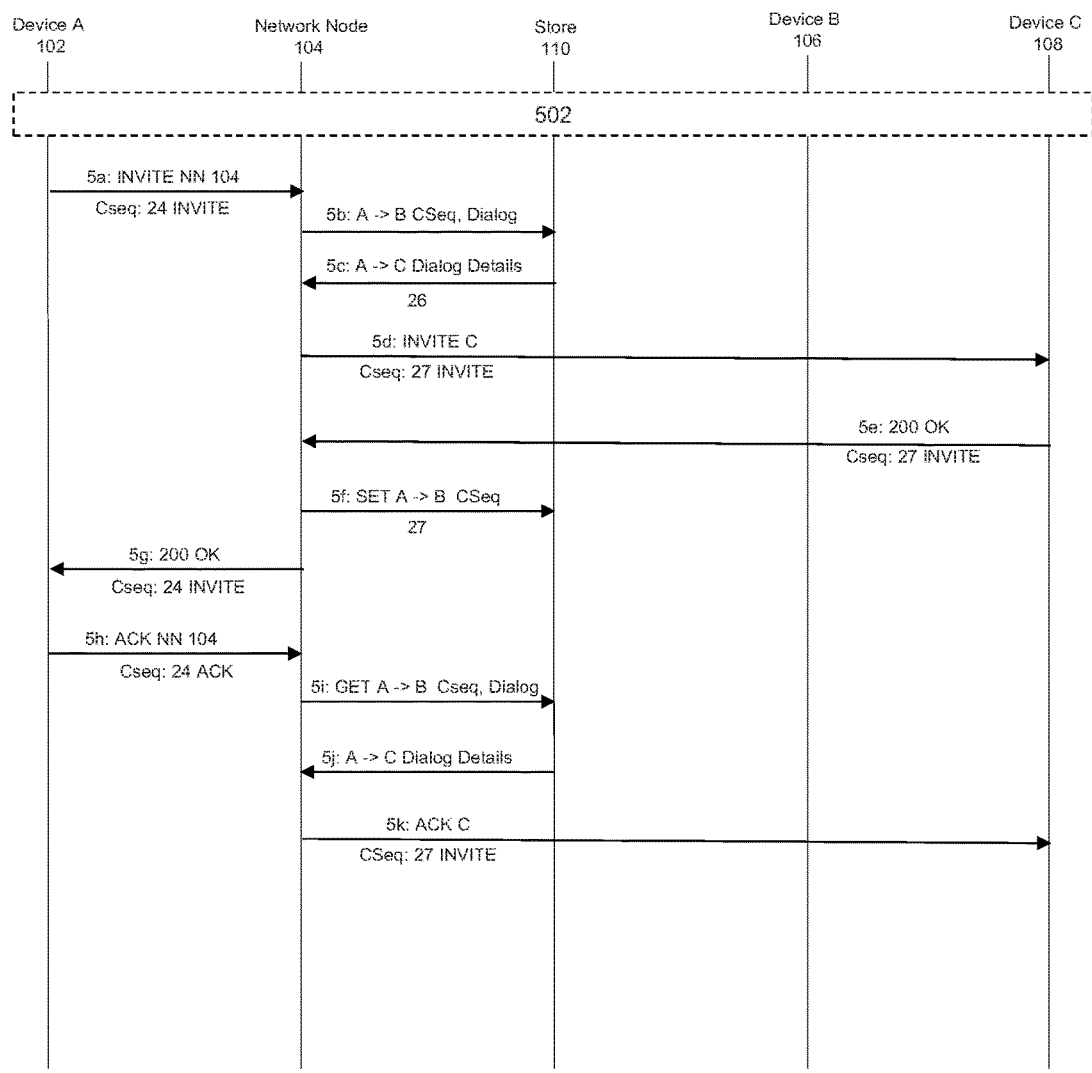
FIG. 5 shows a message flow diagram according to embodiments.

FIG. 5 shows a message flow diagram according to embodiments. FIG. 5 shows a message flow between device A and device C, for example subsequent to the message flow of the embodiments of FIG. 4.

In the embodiments of FIG. 5, network node 104 recognizes itself in the request URI of a received request (indicating that the communication session has been uplifted), retrieves the peer dialog details from data store 110 and fills them in on the forwarded request.

According to embodiments, item 502 indicates broadly the actions carried out in steps 5*a* to 5*k* where network node 104 identifies data associated with itself in the request URI field of a received request and performs B2BUA-style forwarding of SIP messages between the dialog between itself and device A, and the dialog between itself and device C.

In more detail according to embodiments, in step 5*a*, device A sends a SIP INVITE message to network node 104 with a CSeq number of 24. When network node 104 receives the SIP INVITE message of step 5*a*, network node 104 recognizes that it is identified in the request URI field of the SIP INVITE message of step 5*a*. Network node 104 therefore knows that the SIP INVITE message of step 5*a* relates to an uplifted communication session and that it should operate according to B2BUA mode in relation to the SIP INVITE message.

In step 5*b*, network node 104 retrieves state data in data store 110 which is labelled as state data for the communication session dialog between device A and device B. The retrieve action of step 5*b* results in state data associated with a communication session dialog between device A and device C being received by network node 104 in step 5*c*, in this case comprising a CSeq of 26.

In step 5*d*, network node 104 sends a SIP INVITE message to device C with a CSeq number of 27. In step 5*e*, device C transmits a SIP 200 OK message back to network node 104 with a CSeq number of 27.

In step 5*f*, network node 104 writes state data for the communication session dialog between network node 104 and device C with the data being labelled in data store 110 as relating to a communication session dialog between device A and device B, in this case comprising a CSeq number of 27.

In step 5*g*, network node 104 transmits a SIP 200 OK message to device A with a CSeq number of 24.

In step 5*h*, device A sends a SIP ACK message to network node 104 with a CSeq number of 24.

In step 5*i*, network node 104 retrieves state data in data store 110 which is labelled as state data for the communication session dialog between device A and device B. The retrieve action of step 5*i* results in state data associated with a communication session dialog between device A and device C being received by network node 104 in step 5*j*, in this case comprising a CSeq of 27.

In step 5*j*, network node 104 sends a SIP ACK message to device C with a CSeq number of 27.

In the embodiments described above in relation to FIGS. 2 to 5, state data is primarily described as CSeqs; alternatively or in addition, embodiments may involve other types of state data.

In embodiments, the stored communication session dialog state data associated with one or more of the communication session dialog, the first established communication session dialog, and the at least second established communication session dialog comprises one or more of the contents of To and From headers for the respective dialog (for example including the to/from tags that identify the respective dialog), an identifier (for example a call-ID) for the respective dialog, the contents of Contact headers for the respective dialog, the route-set for the respective dialog, and a command sequence number for the respective dialog.

In embodiments, one or more of the stored communication session dialog state data associated with the communication session dialog, the stored communication session dialog state data associated with the first established communication session dialog and the stored communication session dialog state data associated with the at least second established communication session dialog comprises at least one command sequence number.

In embodiments, one or more of the stored communication session dialog state data associated with the communication session dialog, the stored communication session dialog state data associated with the first established communication session dialog and the stored communication session dialog state data associated with the at least second established communication session dialogs is stored at least in part in a data store local to the network node.

In embodiments, one or more of the stored communication session dialog state data associated with the communication session dialog, the stored communication session dialog state data associated with the first established communication session dialog and the stored communication session dialog state data associated with the at least second established communication session dialogs is stored in a distributed data store; in such embodiments, at least a part of the distributed data store comprises a data store local to the network node.

In some embodiments, the data store is local to the network node. In some embodiments, the data store is local to the network node, but replicated to a warm backup network node or written to a distributed data store such as a memcached data store. The latter approach provides fault-tolerance and simple horizontal scalability. Even upon failure of the data store, proxied dialog state can be rebuilt by observing one SIP transaction flow in each direction.

Figure 6:
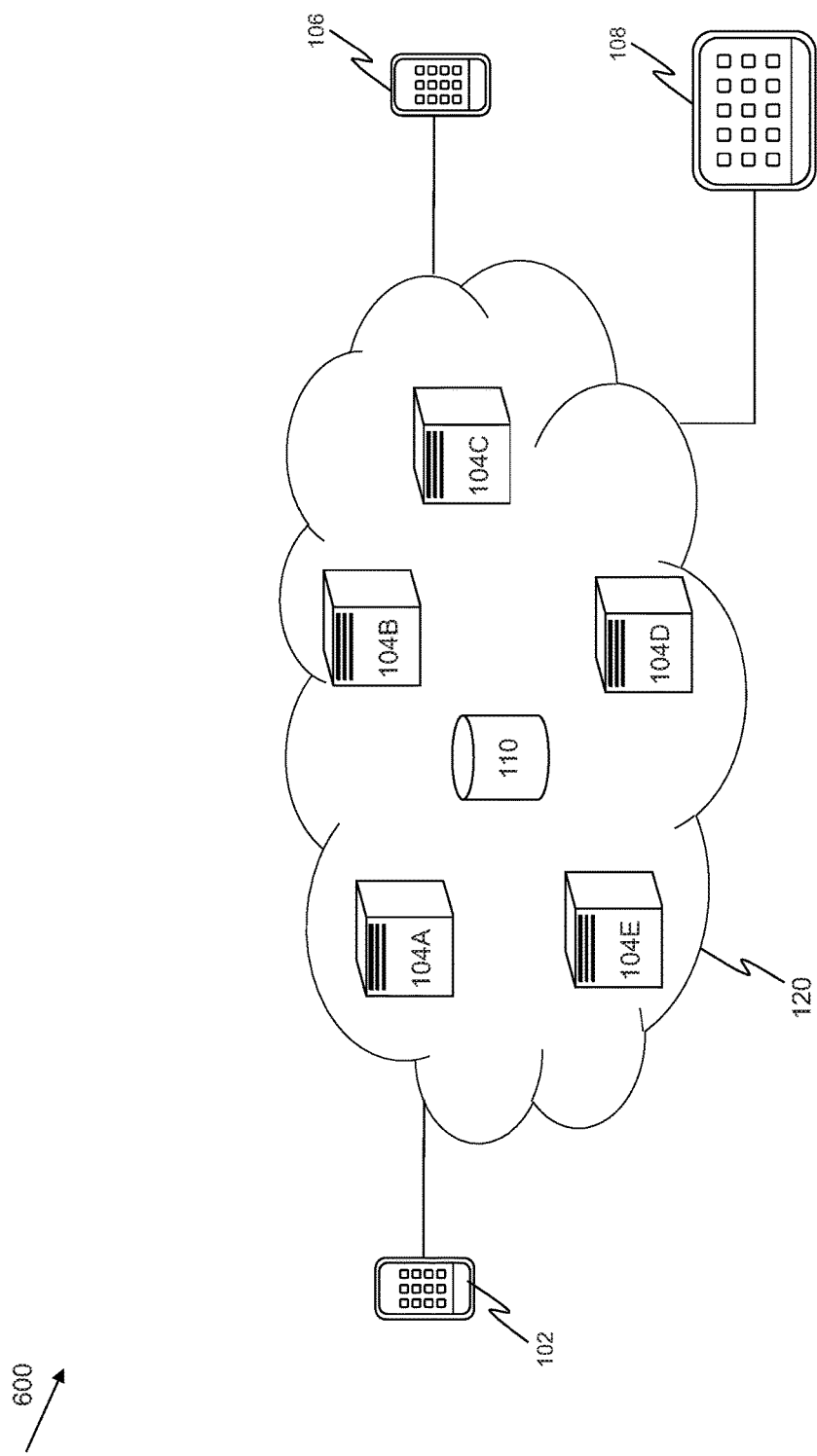
FIG. 6 shows a system diagram of a network according to embodiments.

FIG. 6 shows a system diagram of a network 600 according to embodiments. Network 600 comprises a cluster 120 of network nodes responsible for processing signaling information for communication session dialogs in network 600. Cluster 120 is depicted as comprising five network nodes 104A, 104B, 104C, 104D, 104E, but in practice could have a different number of network nodes. Nodes in the cluster are capable of communicating with each other and other entities (such as user devices 102, 106, 108); wired or wireless connections used for facilitating such communication are omitted from FIG. 6 for the sake of clarity.

Network 600 comprise a data store 110, which is accessible by network nodes in cluster 120, for example to store data therein or retrieve data stored therein. In some embodiments, data store 110 comprises a distributed data store which is distributed across a plurality of nodes in the cluster. In other embodiments, data store 110 comprises a data store local to one or more of the network nodes in the cluster.

Network 600 also comprises user devices 102, 106, 108. In practice, network 600 could have a different number of user devices.

Network node in cluster 120 are capable of communicating with each other and/or user devices 102, 106, 108, for example via one or more wireless or wired communication links and/or one or more other networks or network parts such as an IMS core (not shown).

In embodiments, each time the network node processes signaling information for a given in-progress communication session dialog according to the stateless operating mode, the network node inserts a different unique identifier into a Record-Route header field of a forwarded request for the given in-progress communication session dialog, and each time the network node begins to process signaling information (when uplift is triggered) for a given in-progress communication session dialog according to the state-full operating mode, the network node inserts the different unique identifier into the Contact header field of a forwarded request for the given in-progress communication session dialog. In such embodiments, the unique identifier assists in identifying the "hop" in the route-set (i.e. the point in communication session processing).

Embodiments comprise determining whether a received message comprises a unique identifier previously inserted by the network node in the top Record-Route header field and the URI field, and in response to a negative determination, first deducing that the network node has not previously stored communication session dialog state data associated with the given communication session dialog, and on the basis of the first deducing, forwarding the request for processing by a different network node. Hence, the network does not need to consult the stored communication session dialog state data for every request, but only if/when the top Route header matches the request URI.

Embodiments comprise, in response to a positive determination, second deducing that the network node has previously stored communication session dialog state data associated with the given communication session dialog, and on the basis of the second deducing, processing the request at the network node according to the state-full operating mode.

Note that requests may include Route headers, so in embodiments, the network node by default forwards according to those instead of recognizing itself in the request URI. It is not possible to change the route set of an established dialog, so in embodiments the network node ignores the Route headers if it appears (i.e. is identified) in the request URI. This can present a problem if the network node appears twice in a call flow, e.g. device A<->network node<->IMS Core<->network node<->device B. To work around this, in embodiments the network node inserts a unique identifier, such as a random identifier, in the Route header each time it is invoked, and this random header is propagated to the Contact header and hence request URI when the network node uplifts from proxy to B2BUA mode. This allows the network node to identify itself correctly, even in this scenario.

Embodiments involving the above unique identifier behavior are now described in more detail. On the initial request, each time the network node is invoked, it adds a Record-Route header with a unique identity. For example, the first time the network node is invoked it might add sip:proxy-b2bua-cluster;id=1 and the second time it might add sip:proxy-b2bua-cluster;id=2. By the time the request reaches device B, it might have Record-Route headers specifying sip:proxy-b2bua-cluster;id=1, sip:ims-core and sip:proxy-b2bua-cluster;id=2.

These Record-Route headers form the route-set and are used as Route headers on subsequent requests, so when device A sends a new in-dialog request, it includes Route headers specifying sip:proxy-b2bua-cluster;id=1, sip:ims-core and sip:proxy-b2bua-cluster;id=2.

When B2BUA uplift occurs, it occurs at one of the two network node hops (depending on how the B2BUA uplift was triggered). As described above, the network node sends an SIP INVITE message with a Contact header specifying the network node. Specifically, the network node includes sip:proxy-b2bua-cluster;id=1 or sip:proxy-b2bua-cluster;id=2 in the Contact header. For the present example, the latter is assumed.

When device A now sends a new in-dialog request, it uses the same Route headers as above, but now includes sip:proxy-b2bua-cluster;id=2 as the request URI. Since the Route headers specify sip:proxy-b2bua-cluster;id=1, sip:ims-core and sip:proxy-b2bua-cluster;id=2, it first sends the request to sip:proxy-b2bua-cluster;id=1. The network node compares the first Route header (id=1) with the request URI (id=2) and finds they do not match. As a result, the network node acts as a proxy, strips the first Route header and forwards the request on to sip:ims-core. The IMS Core strips the second Route header and forwards the request on to sip:proxy-b2bua-cluster;id=2. The network node then compares the one remaining Route header with the request URI, finds they do match and performs the B2BUA function described above (involving looking up the dialog state in the data store and modifying the request).

Later on, device B may try to perform a call jump function causing B2BUA uplift at the network node with id=2. Each traversal of the network node can be uplifted to B2BUA independently.

In embodiments, the network node comprises a network node in a cluster of network nodes responsible for processing signaling information for communication session dialogs in the network.

The above embodiments are to be understood as illustrative examples. Further embodiments are envisaged.

For example, the embodiments described above show no synchronization on updates to the store, so if multiple requests are received (approximately) simultaneously, it might be possible to end up with inconsistent state in the data store. To avoid this, in embodiments the data store uses a consistency mechanism, for example transactions or optimistic locking. In embodiments, the data store provides more explicit operations that would not require locking, such as "set CSeq to at least X" or suchlike.

In some embodiments employing synchronous data store updates, the write to the data store is performed before network node forwards a 200 OK message received from one user device back to the other user device; taking the embodiments depicted in FIG. 2 for example, this would mean that step 2e is performed before step 2d.

In embodiments, the data store sets a 'time-to-live' (TTL) on dialog state, to ensure that the state is cleared up eventually even if the communication session ends in an 'unclean' manner (for example without an explicit SIP BYE transaction). In embodiments, to ensure that dialog state is maintained as long as the communication session is active, a SIP Session-Expires header is used such that the user devices send regular re-INVITEs on the dialog.

In embodiments, if the data store fails for some reason, regular re-INVITE processing can be used to rebuild state. According to embodiments, by observing two requests (one in each direction), the CSeq and full dialog details can be reconstituted after data store failure.

If the same network node in the cluster is invoked multiple times for the same dialog (for example because a call is routed in from a user device and then back out to the same user device), there is no need to update the store multiple times. Indeed, if optimistic locking is employed, this could result in worse performance. According to embodiments, the network node can detect if it has already been involved in a given dialog by examining the Via headers on SIP requests, and hence make this optimization.

Embodiments comprise the network node examining one or more Via headers of the received message to determine whether a different node to the network node has previously stored communication session dialog state data associated with the communication session dialog, whereby to avoid storing communication session dialog state data associated with the communication session dialog multiple times.

In embodiments, to reduce window conditions in which user devices send requests while uplift is taking place at the network node (which might result in a CSeq being used by the network node which has already been used, for example by a B2BUA), the network node can increase the CSeq by more than 1 (say by 1000). The CSeq value does not need to increase by 1 each time, but will generally be larger than the previous value. A user device rejects CSeqs that are smaller, but user devices can handle this case anyway, as network conditions can cause SIP requests to be delivered out of order.

In embodiments, as well as uplift from proxy mode to B2BUA mode at the network node, 'downlift' from B2BUA mode to the original proxied call in proxy mode can be performed at the network node. In embodiments, the proxied dialog that was 'downlifted' to is the same as the dialog it was originally uplifted from. In embodiments, the CSeqs on the two halves of the proxied dialog are matched up, for example by storing the difference in CSeqs on the Contact headers sent to the two parties.

In embodiments described above, a user device does not make an explicit request to change mode. In embodiments, an indication that a mode change may be required is implicit in another request, for example interpreted by the network node, or could be triggered by an out-of-band request or a third-party request.

In order to uplift from stateless operating mode to state-full operating mode for a communication session, a user device need not provide any current dialog state because dialog state for the current dialog is being stored by the network node as it operates in stateless operating mode.

In embodiments, the network node recognizes that the user of the user device from which a request is received is trying to perform a call jump operation (for example by observing a SIP REFER request, a SIP INVITE request with a Replaces header, a SIP INVITE to a dedicated URI, or suchlike) and that the target user device does not support this so, in order to deal with the request, the network node determines that it should uplift to B2BUA mode (because both request types involve stitching together two dialogs).

In embodiments, uplift from operating in a stateless operating mode for a communication session to operating in a state-full operating mode for the communication session is performed in response to receipt of an out-of-band request (for example over a Hypertext Transfer Protocol (HTTP) application programming interface (API)).

In embodiments, uplift from operating in a stateless operating mode for a communication session to operating in a state-full operating mode for the communication session is performed in response to receipt of a third-party request (for example signaled over SIP but from a party not already involved in the call).

In alternative embodiments, instead of network node 104 transmitting the INVITE of step 3c and then later transmitting the BYE of step 4c, network node 104 transmits the BYE of step 4c to device B first without transmitting the INVITE of step 3c to device B.

One or more of the aspects of the embodiments described herein with reference to the drawings comprise processes performed by one or more network nodes. In embodiments, the one or more network nodes comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of operating a network node in a network, the method comprising:
    receiving signaling information, at the network node, for an in-progress communication session dialog;
    processing, at the network node, the signaling information of said in-progress communication session dialog according to a stateless operating mode, wherein the processing according to the stateless operating mode comprises storing communication session dialog state data associated with said in-progress communication session dialog and wherein each time the network node processes signaling information for a given in-progress communication session dialog according to the stateless operating mode, the network node inserts a different unique identifier into a Record-Route header field of a first forwarded request for the given in-progress communication session dialog;
    detecting, at the network node, an operating mode change trigger;
    in response to the detection, retrieving, at the network node, said stored communication session dialog state data during said in-progress communication session dialog;
    processing, at the network node, the signaling information for the in-progress communication session dialog according to a state-full operating mode, wherein the processing according to the state-full operating mode is carried out based at least in part on said retrieved communication session dialog state data, and wherein each time the network node begins to process signaling information for a given in-progress communication session dialog according to the state-full operating mode, the network node inserts the different unique identifier into a Contact header field of a second forwarded request for the given in-progress communication session dialog,
    determining whether a received message comprises a unique identifier previously inserted by the network node in a top Record-Route header field and a URI field;
    in response to a negative determination, first deducing that the network node has not previously stored communication session dialog state data associated with the given communication session dialog;
    on the basis of the first deducing, forwarding the request having the different unique identifier for processing by a different network node;
    in response to a positive determination, second deducing that the network node has previously stored communication session dialog state data associated with the given in-progress communication session dialog; and
    on the basis of the second deducing, processing the forwarded request at the network node according to the state-full operating mode.

2. The method of claim 1, wherein the processing according to the stateless operating mode does not comprise retrieving the stored communication session dialog state data associated with the communication session dialog.

3. The method of claim 1, wherein the detecting comprises inferring the operating mode change trigger from the signaling information for the in-progress communication session dialog processed according to the stateless operating mode.

4. The method of claim 1, comprising, prior to the detecting, receiving a message from a device, wherein the detecting comprises inferring the operating mode change trigger from the received message.

5. The method of claim 4, wherein the received message does not comprise communication session dialog state data.

6. The method of claim 4, wherein the received message does not comprise an explicit request to change operating mode.

7. The method of claim 4, wherein the received message comprises a communication session dialog transfer request.

8. The method of claim 7, wherein the device from which the message is received is involved in the in-progress communication session dialog,
    wherein the device from which the message is received is associated with a given user, and
    wherein the communication session dialog transfer request comprises a request to transfer the in-progress communication session dialog from the device associated with the given user which is involved in the in-progress communication session dialog to another device associated with the given user which is not involved in the in-progress communication session dialog.

9. The method of claim 7, wherein the device from which the message is received is not involved in the in-progress communication session dialog,
    wherein the device from which the message is received is associated with a given user, and
    wherein the communication session dialog transfer request comprises a request to transfer the in-progress communication session dialog from a dialog to the device associated with the given user which is not involved in the in-progress communication session dialog.

10. The method of claim 4, wherein the received message comprises a Session Initiation Protocol (SIP) INVITE message, a Session Initiation Protocol (SIP) REFER message, or a SIP INVITE (Replaces) message.

11. The method of claim 4, wherein the processing according to the state-full operating mode comprises transmitting at least one communication session dialog update request comprising contact data for the network node, the method comprising:
    receiving a further message;
    identifying that the further received message comprises the contact data for the network node; and
    in response to the identification, processing the further received message according to the state-full operating mode.

12. The method of claim 11, wherein processing the further received message according to the state-full operating mode comprises retrieving stored communication session dialog state data for one or more communication session dialogs associated with the further received message.

13. The method of claim 12, wherein the retrieved stored communication session dialog state data for the one or more communication session dialogs comprises data identifying a different device than a device from which the further received request was received, and wherein processing the further received message according to the state-full operating mode comprises forwarding the further received message to the identified different device.

14. The method of claim 11, wherein the contact data for the network node is comprised in a uniform resource identifier (URI) field of the further received message.

15. The method of claim 11, further comprising in response to the identification, ignoring contents of one or more Route header fields of the further received message.

16. The method of claim 15, wherein the ignoring comprises not forwarding the further received message to a destination identified in the one or more Route header fields of the further received message.

17. The method of claim 4, comprising examining one or more Via headers of the received message to determine whether a different node to the network node has previously stored communication session dialog state data associated with the in-progress communication session dialog, whereby to avoid storing the communication session dialog state data associated with the in-progress communication session dialog multiple times.

18. The method of claim 1, wherein the processing according to the state-full operating mode comprises transmitting at least one communication session dialog update request comprising contact data for the network node.

19. The method of claim 18, wherein the contact data indicates a destination address of the network node as a destination to where subsequent requests should be transmitted.

20. The method of claim 18, wherein the contact data is inserted in a Contact header field of the at least one respective communication session dialog update request.

21. The method of claim 1, wherein the in-progress communication session dialog comprises a communication session dialog between a first device and at least a second device, and wherein the processing according to the state-full operating mode comprises:
transmitting a first communication session dialog update request to the first device comprising contact data for the network node; and
transmitting a second communication session dialog update request to the at least second device comprising the contact data for the network node.

22. The method of claim 21, wherein:
in response to the transmittal of the first communication session dialog update request, a first communication session dialog between the network node and the first device is established; and
in response to the transmittal of the at least second communication session dialog update request, a second communication session dialog between the network node and at least the second device is established.

23. The method of claim 22, comprising storing communication session dialog state data associated with the first established communication session dialog and the at least second established communication session dialog.

24. The method of claim 23, wherein stored communication session dialog state data associated with one or more of the in-progress communication session dialog, the first established communication session dialog, and the at least second established communication session dialog comprises one or more of:

contents of To and From headers for the respective in-progress communication session dialog,
an identifier for the respective in-progress communication session dialog,
contents of Contact headers for the respective in-progress communication session dialog,
a route-set for the respective in-progress communication session dialog, and
a command sequence number for the respective in-progress communication session dialog.

25. The method of claim 1, wherein one or more of the stored communication session dialog state data associated with the in-progress communication session dialog, a stored communication session dialog state data associated with a first established communication session dialog and a stored communication session dialog state data associated with an at least second established communication session dialog comprises at least one command sequence number.

26. The method of claim 1, wherein one or more of the stored communication session dialog state data associated with the in-progress communication session dialog, a stored communication session dialog state data associated with a first established communication session dialog and a stored communication session dialog state data associated with an at least second established communication session dialogs is stored at least in part in a data store local to the network node.

27. The method of claim 1, wherein one or more of the stored communication session dialog state data associated with the in-progress communication session dialog, the stored communication session dialog state data associated with the first established communication session dialog and the stored communication session dialog state data associated with the at least second established communication session dialogs is stored in a distributed data store, wherein at least a part of the distributed data store comprises a data store local to the network node.

28. The method of claim 1, wherein the stateless operating mode comprises a proxy signaling mode and the state-full operating mode comprises a back-to-back user agent signaling mode.

29. The method of claim 1, wherein the network node comprises a network node in a cluster of network nodes responsible for processing signaling information for communication session dialogs in the network.

30. A system for use in operating a network node in a network, the system comprising at least one memory including computer program code; and at least one processor in data communication with the at least one memory, wherein the at least one processor is configured to, at the network node:
process signaling information for an in-progress communication session dialog according to a stateless operating mode, wherein the processing according to the stateless operating mode comprises the network node storing communication session dialog state data associated with said in-progress communication session dialog in a data store and wherein each time the network node processes signaling information for a given in-progress communication session dialog according to the stateless operating mode, the network node inserts a different unique identifier into a Record-Route header field of a first forwarded request for the given in-progress communication session dialog;
detect an operating mode change trigger;
in response to the detection, retrieve the stored communication session dialog state data associated with the in-progress communication session dialog from the data store during said in-progress communication session dialog;

process signaling information for said in-progress communication session dialog according to a state-full operating mode, wherein the processing according to the state-full operating mode is carried out based at least in part on the retrieved communication session dialog state data associated with said in-progress communication session dialog, and wherein each time the network node begins to process signalling information for a given in-progress communication session dialog according to the state-full operating mode, the network node inserts the different unique identifier into a Contact header field of a second forwarded request for the given in-progress communication session dialog, determine whether a received message comprises a unique identifier previously inserted by the network node in a top Record-Route header field and a URI field;

in response to a negative determination, first deducing that the network node has not previously stored communication session dialog state data associated with the given communication session dialog;

on the basis of the first deducing, forwarding the request having the different unique identifier for processing by a different network node;

in response to a positive determination, second deducing that the network node has previously stored communication session dialog state data associated with the given in-progress communication session dialog; and on the basis of the second deducing, processing the forwarded request at the network node according to the state-full operating mode.

31. A non-transitory computer-readable storage medium comprising computer-executable instructions which, when executed by a processor, cause a computing device to perform a method of operating a network node in a network, the method comprising:

processing signaling information at the network node for an in-progress communication session dialog according to a stateless operating mode, wherein the processing according to the stateless operating mode comprises storing communication session dialog state data associated with the in-progress communication session dialog while the communication session dialog remains in progress, and wherein each time the network node processes signaling information for a given in-progress communication session dialog according to the stateless operating mode, the network node inserts a different unique identifier into a Record-Route header field of a first forwarded request for the given in-progress communication session dialog;

detecting an operating mode change trigger at the network node;

in response to the detection, retrieving the stored communication session dialog state data associated with the in-progress communication session dialog;

processing signaling information at the network node for the in-progress communication session dialog according to a state-full operating mode, wherein the processing according to the state-full operating mode is carried out based at least in part on the retrieved communication session dialog state data associated with the in-progress communication session dialog, and wherein each time the network node begins to process signaling information for a given in-progress communication session dialog according to the state-full operating mode, the network node inserts the different unique identifier into a Contact header field of a second forwarded request for the given in-progress communication session dialog, determining whether a received message comprises a unique identifier previously inserted by the network node in a top Record-Route header field and a URI field;

in response to a negative determination, first deducing that the network node has not previously stored communication session dialog state data associated with the given communication session dialog;

on the basis of the first deducing, forwarding the request having the different unique identifier for processing by a different network node;

in response to a positive determination, second deducing that the network node has previously stored communication session dialog state data associated with the given in-progress communication session dialog; and on the basis of the second deducing, processing the forwarded request at the network node according to the state-full operating mode.

32. A method of operating a network node in a network, the method comprising:

processing signaling information at the network node for an in-progress communication session dialog according to a stateless operating mode and wherein each time the network node processes signaling information for a given in-progress communication session dialog according to the stateless operating mode, the network node inserts a different unique identifier into a Record-Route header field of a first forwarded request for the given in-progress communication session dialog;

storing communication session dialog state data associated with said in-progress communication session dialog in a data store;

detecting an operating mode change trigger at the network node;

in response to the detection, retrieving the stored communication session dialog state data associated with the in-progress communication session dialog from the data store;

entering a state-full operating mode in relation to the in-progress communication session dialog, wherein the entering is carried out based at least in part on the retrieved communication session dialog state data associated with the in-progress communication session dialog and the entering comprises transmitting at least one communication session dialog update request comprising contact data for the network node, and wherein each time the network node begins to process signaling information for a given in-progress communication session dialog according to the state-full operating mode, the network node inserts the different unique identifier into a Contact header field of a second forwarded request for the given in-progress communication session dialog, determining whether a received message comprises a unique identifier previously inserted by the network node in a top Record-Route header field and a URI field;

in response to a negative determination, first deducing that the network node has not previously stored communication session dialog state data associated with the given communication session dialog;

on the basis of the first deducing, forwarding the request having the different unique identifier for processing by a different network node;
in response to a positive determination, second deducing that the network node has previously stored communication session dialog state data associated with the given in-progress communication session dialog; and
on the basis of the second deducing, processing the forwarded request at the network node according to the state-full operating mode.

* * * * *